United States Patent [19]

Martinez

[11] 4,209,269
[45] Jun. 24, 1980

[54] APPLIANCE FOR THE ASSEMBLY OF LARGE-DIAMETER PIPES BY JOINTING

[76] Inventor: Louis G. Martinez, 196 Boulevard Faidherbe, 59400 Cambrai, France

[21] Appl. No.: 918,193

[22] Filed: Jun. 22, 1978

[30] Foreign Application Priority Data

Jun. 22, 1977 [FR] France ............................. 77 19121

[51] Int. Cl.² ........................................... F16L 1/00
[52] U.S. Cl. ................................... 405/154; 405/169; 405/170
[58] Field of Search ............... 405/167, 169, 170, 171, 405/154, 156, 158, 132, 150

[56] References Cited

U.S. PATENT DOCUMENTS

| | | | |
|---|---|---|---|
| 1,874,081 | 8/1932 | Burrows | 405/170 |
| 2,156,651 | 5/1939 | Gardiner | 405/170 X |
| 2,807,937 | 10/1957 | Rhodes | 405/170 |
| 3,834,169 | 9/1974 | Abbott | 405/170 |

Primary Examiner—Dennis L. Taylor
Attorney, Agent, or Firm—Beveridge, DeGrandi, Kline & Lunsford

[57] ABSTRACT

The appliance comprises on a carriage 3 running inside the pipes 1,2, two struts 8 manipulated by two jacks 14 in order to make two shoes 13 and an arch 21 pivot against the inner face of the pipe 1 already laid, as well as a jack 26 for jointing the pipe 2 to be laid into the pipe 1 after having made it bear against the arch 21 which keeps it centered during the jointing.

Application: to the laying of concrete pipe sections for drainage mains.

Reference: FIG. 1.

14 Claims, 2 Drawing Figures

APPLIANCE FOR THE ASSEMBLY OF LARGE-DIAMETER PIPES BY JOINTING

The present invention refers to an appliance for assembly of large-diameter pipes by jointing, in particular concrete pipes employed mainly for drainage.

The laying of such pipes which may have diameters of several meters and masses of some tons presents difficulties especially when this laying takes place in a trench. Generally each pipe is lowered, girdled by a sling hooked to a crane above the bottom of the trench so that its male end is lying substantially facing the female end of the pipe previously laid. Next a haulage appliance of cable type is hooked to a sling placed, for example, round one of the pipes already laid. The hook of the haulage appliance is connected to the sling supporting the pipe to be laid and the male end of the pipe to the laid is jointed into the female end of the pipe already laid, by manipulating the haulage appliance. During the whole of this operation the pipe must remain suspended in the hoist sling.

This jointing must be effected with very great accuracy, especially when watertightness between two successive pipes is ensured simply by a watertight joint of elastomer introduced before the laying into a groove on the outside of the male end of each pipe. In fact even if the watertight joint on the male end of the pipe to be laid as well as the female end of the pipe already laid are coated with a lubricant, for example, soap, a very slight eccentricity of the male end with respect to the female end may already cause damage to the watertight joint at the time of manipulating of the haulage appliance. Hence it is necessary to call upon the services of several workmen who from the outside of the pipes guide the pipe to be laid during the jointing. That presents serious dangers of injury to which are added at the time of laying in a trench, the risks of caving in. In spite of that it still very frequently happens that the watertight joint is damaged especially because the workman manipulating the haulage appliance is remote from the assembly zone and hence cannot follow the development of the jointing operation.

The jointing of two pipes may equally well be carried out by haulage inside the pipes, by means of a haulage appliance which generally bears on the one hand against a man-hole located every forty to sixty meters along such drainage pipes and on the other hand against a piece of timber, an iron bar or a like part laid across against the internal abutment collar of the female end of the pipe to be laid. But in this case likewise it is, however, necessary to provide supplementary workmen in order to ensure guidance of the pipe to be laid during the jointing and the workman manipulating the haulage appliance is remote from the pipe to be jointed.

The laying of such pipes in a trench hitherto has demanded the employment of a first machine, for example, a hydraulic one for digging the trench and a second mechanical machine for lowering the pipes into the trench. It is in fact forbidden to work underneath a load suspended from a hydraulic machine since the simple breakage of a hose, for example, may cause falling of the load. This necessity of having available two machines substantially loads the cost of the laying of such pipes.

The object of the present invention is an appliance which simplifies the assembly of large-diameter pipes by jointing and substantially reduces the risks of laying such pipes. The object of the invention likewise is an appliance which enables the cost of laying of these pipes to be reduced.

The appliance in accordance with the invention comprises a carriage capable of running inside the laid pipes along the bottom of them. On this carriage are mounted a device for rendering the carriage immovable in the last pipe laid, at the female end of the latter, and for levelling and centreing the male end of the pipe to be laid upon the female end of the laid pipe. Furthermore on this same carriage is mounted a haulage device which bears against the pipe to be laid in order to joint the male end of the latter into the female end of the laid pipe.

The carriage enables the appliance to be moved as the laying of the pipework progresses by the assembly of elemental pipes. For each pipe to be laid, the carriage is rendered immovable in the last pipe laid, the pipe to be laid is levelled and centred with respect to the pipe already laid and the pipe to be laid is jointed into the laid pipe by manipulation of the haulage appliance.

In accordance with an advantageous embodiment of the invention, the device for rendering immovable and for levelling and centreing comprises at least one strut hinged between its two ends onto the carriage so as to be able to pivot in a vertical plane longitudinal to the carriage. A shoe is articulated onto the bottom end of this strut. Furthermore an arch is hinged onto the top end of this same strut so as to be able to pivot in a vertical plane longitudinal to the carriage. The device comprises in addition a manipulator member for making the strut pivot so as to set it upright again with respect to its rest position in order to make the shoe and the arch bear against the inner face of the laid pipe at two points nearly diametrically opposite.

In order to enable the employment of one and the same appliance for pipes of different diameters it is advantageous that the strut be telescopic.

Preferably the struts are two in number, are mounted side by side on the carriage and are connected each to one of two outer segments of the arch which is composed of three segments hinged together along axes extending in the direction of the length of the carriage.

In order to facilitate manipulation of the appliance, the manipulator member for the strut and the haulage devices advantageously consist of hydraulic jacks fed by a common hydraulic pump by way of a regulator.

Other characteristics and advantages of the object of the invention will become apparent from reading the description below of a non-restrictive embodiment of an appliance in accordance with the invention; in this drawing.

Figure 1:
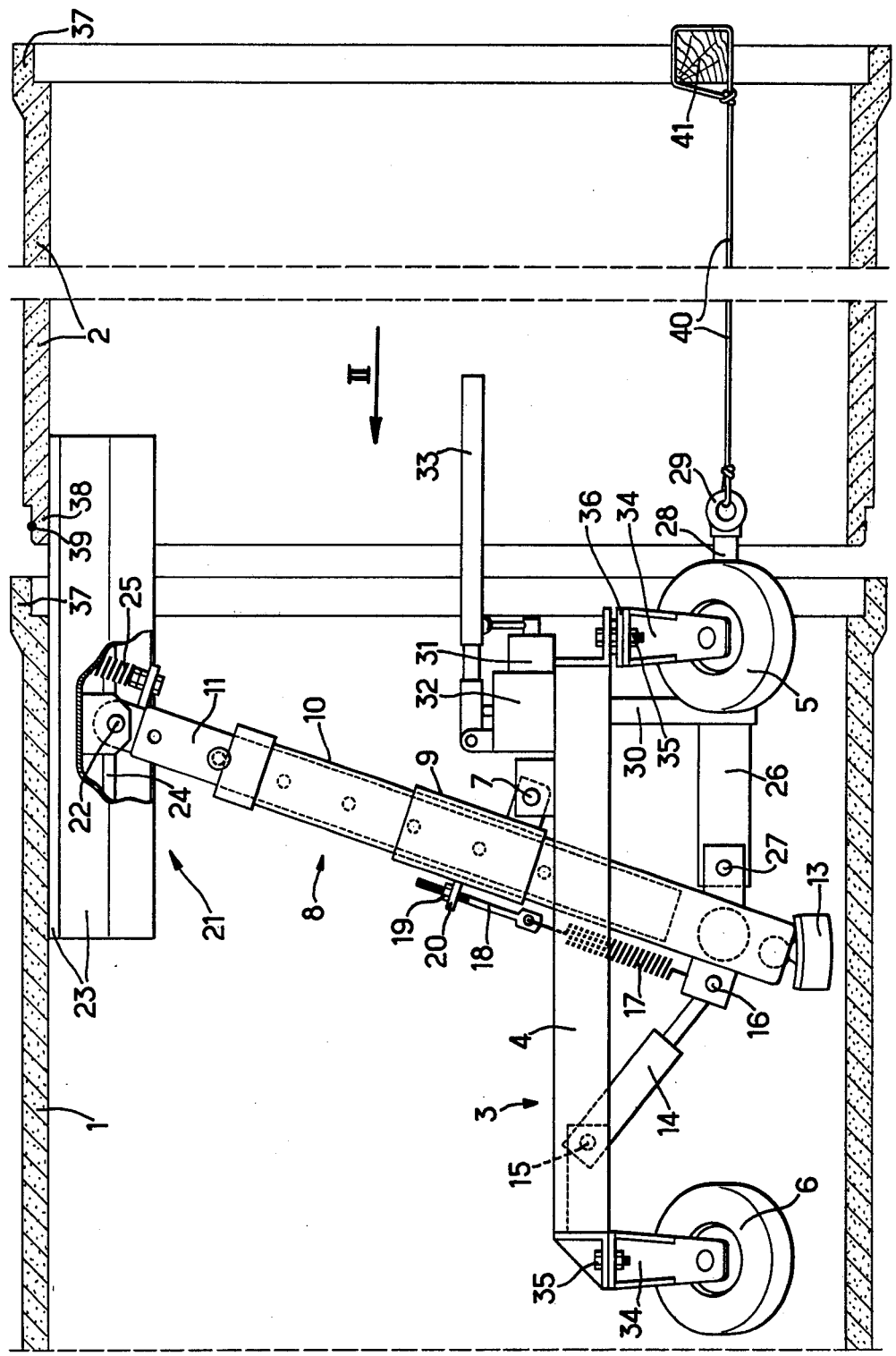
FIG. 1 is a side elevation of an embodiment of the appliance in accordance with the invention inside a pipe represented in vertical longitudinal section.

The appliance in accordance with the invention, being used for the assembly of two pipes 1, 2, for example, of concrete, comprises a carriage 3 capable of running inside the pipes. The carriage is formed of a frame 4, preferably welded, carried by two front wheels 5 and two rear wheels 6. The wheels are inclined towards the outside so that the planes of the said wheels are substantially perpendicular to the tangent to the internal circumference of the pipe, at the point of contact of each wheel with the said circumference.

Two telescopic struts 8 are hinged onto the frame 4 by two aligned horizontal axes of hinge 7, perpendicular to the longitudinal axis of the carriage 3, so as to be able to pivot in two vertical planes longitudinal to the carriage 3. Each strut 8 comprises an outer tubular section 9 hinged by the said axis 7 onto the frame 4, a central tubular section 10 extending on opposite sides beyond the section 9 and able to slide in the latter, as well as an inner section 11 which extends upwards from the central section 10. The tubular section 11 has transverse holes which by means of pins (not shown) or like members enable the depth of retreat of the section 11 into the section 10 to be limited. The two central tubular sections 10 are connected together substantially at their two ends by two crossbars 12.

Each of the two tubular sections 10 exhibits at its bottom end a shoe 13 articulated by a ball-joint onto the section 10.

Two hydraulic jacks 14 are hinged onto the rear of the frame 4 along aligned horizontal axes of hinge 15, perpendicular to the longitudinal axis of the carriage 3, so as to be able to pivot in the same planes as the struts 8. The piston rod of each these jacks 14 is hinged onto the tubular section 10 below the frame 4, substantially at the bottom end of the section 10, by axes of hinge 16. A tension spring 17 extended by a threaded rod 18 is hooked onto each of the pins 16, the nut 19 screwed onto the threaded rod 18 bearing against a projecting claw 20 fixed at the rear onto the tubular section 9. The spring 17 tries to make the section 10 rise with respect to the section 9 in which it can slide.

Onto the top end of the two tubular sections 11 of the strut 8 an arch 21 is hinged about two aligned transverse horizontal axes 22 so that the said arch can pivot with respect to the struts 8 in a vertical plane longitudinal to the carriage. The arch 21 is composed of a number of curved segments 23 hinged together along longitudinal axes 24. The two tubular sections 11 are hinged onto the two outer segments 23 of the arch. A compression spring 25 is inserted between the top end of each tubular section 11 and the arch 21 in front of the axes of hinge 22 so that the springs 25 try to make the arch 21 pivot as a whole in an anti-clockwise direction in FIG. 1.

A hydraulic jack 26 is mounted below the frame 4 in the central longitudinal plane of the carriage 3. The jack 26 is hinged by a horizontal transverse axis 27 onto the bottom crossbar 12. Its piston rod 28 which extends towards the front ends in an eye 29. The jack 26 is held in a substantially horizontal position by a stirrup 30 fixed below the frame 4.

The control of the jacks 14 and 26 is effected by way of a regulator 31 by a common hydraulic pump 32 which in the example represented is operated manually by means of a lever 33.

Figure 2:
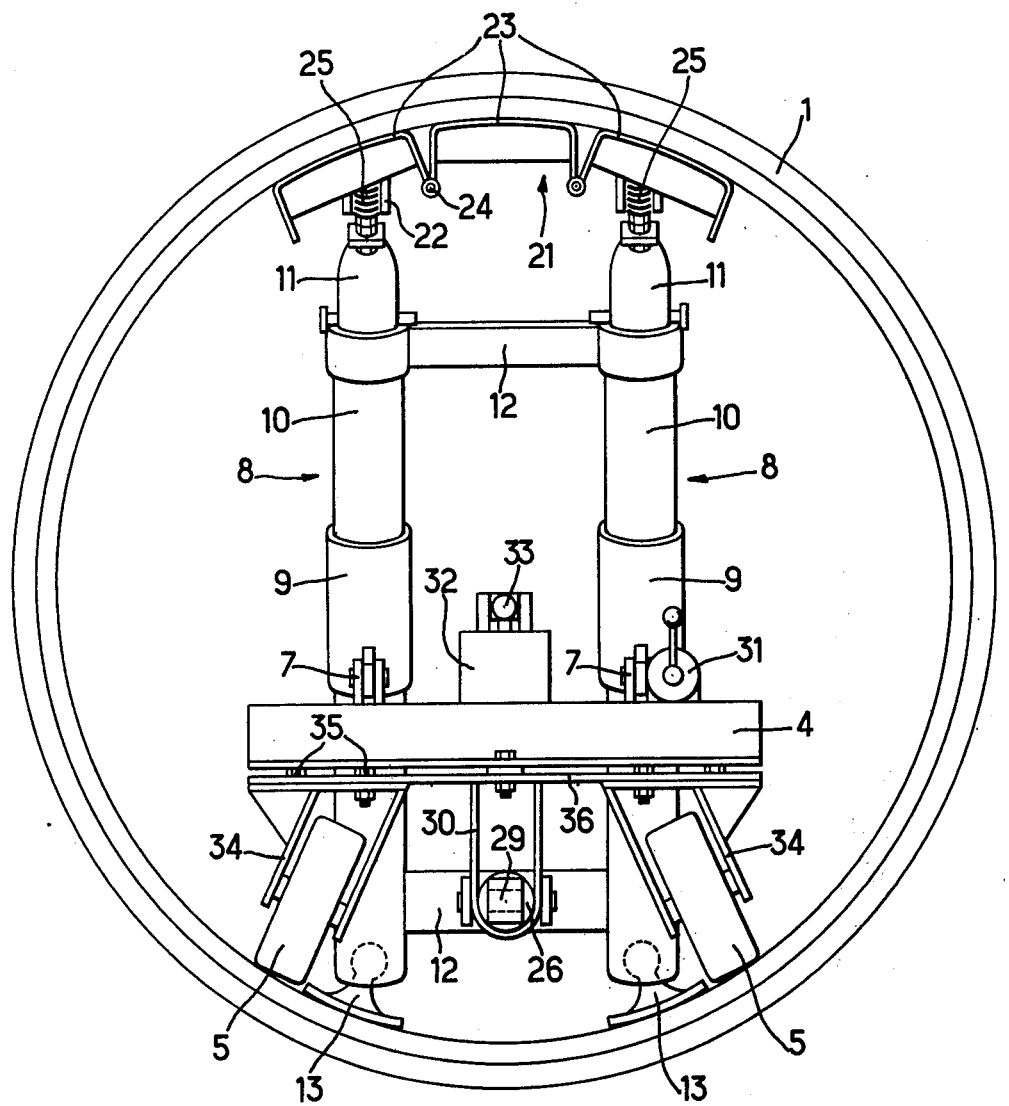
FIG. 2 is a view looking in the direction of the arrow II in FIG. 1.

From FIG. 2 it may be recognised that the separation of the left and right wheel (the track) both at the front and the rear is adjustable, that is, by the fact that the forks 34 carrying the wheels may be fixed with variable spacing onto the frame 4, for example, by means of bolts 35. Furthermore the front wheels 5 can be turned because their forks 34 are fixed onto a common support 36 hinged by a single central bolt onto the frame 4. This turning of the front wheels may be advantageous, for example, for moving the device outside the pipes.

There will now be described below the method of laying pipes by means of the device in accordance with the invention, with a view to letting the operation of the latter be better understood.

The pipe 1 constitutes the last pipe laid of a series of pipes, for example, of concrete, which constitute a main in a drainage system. In the case illustrated it is a matter of assembling another pipe 2 with the pipe 1.

In the usual way each of the pipes 1,2 has a female end 37 having a collar and a male end 38 intended for being jointed into the female end 37. The male end 38 bears a watertight joint 39 of elastomer laid in a groove provided on the male end 38.

The appliance in accordance with the invention, located inside the pipe 1, is advanced in the direction of the free end of the latter, under the circumstances in the direction of the female end 37, so that its front wheels 5 are lying close to the female end 37. The overall length of the struts 8 is adjusted so that it is just a little greater than the diameter of the pipes. During this placing in position, the jacks 14 are not under pressure and the struts 8 are occupying a more sloping position with respect to the vertical than in FIG. 1, under the action of the spring 17. The shoes 13 and the arch 21 are not in contact with the inner face of the pipe 1.

The pump 32 is next operated in order by means of the regulator 31 to send oil under pressure into the jacks 14 the piston rod 15 of which thus emerges from the cylinder. That impresses upon the struts 8 a pivotal motion in the anticlockwise direction in FIG. 1 about the axis of hinge 7. Consequently the shoes 13 on the one hand and the arch 21 on the other are brought to bear at two more or less diametrically opposite points against the inner face of the pipe 1, which locks the appliance with respect to the pipe 1, the arch 21 extending beyond the female end 37 over a portion of its length.

The pipe 2 suspended, for example, from a sling, its male end 38 being turned towards the female end 37 of the pipe 1, is then brought from above and from the right in FIG. 1 into alignment with the pipe 1 so that the top portion of its male end 38 comes to bear by its inner face against the arch 21. The eye 29 on the piston rod 28 of the jack 26 is attached to one end of the cable 40 the other end of which is secured to a counter-brace 41, for example, a piece of timber or an iron bar, placed across in the collar of the female end 37 of the pipe 2. By sending oil under pressure from the pump 2 by way of the regulator 31 into the jack 26, the pipe 2 held centred with respect to the pipe 1 thanks to its bearing against the arch 21 is thrust in the direction of the pipe 1 until its male end 38 is jointed into the female end 37 of the pipe 1. This centreing ensures correct introduction of the watertight joint 39 into the collar of the female end 37 of the pipe 1, whence perfectly watertight assembly of the two pipes 1 and 2.

After jointing of the pipe 2 into the pipe 1 and after wedging of the pipe 2, the pressure in the cylinder 26 is relaxed in order to be able to unhook the haulage cable 40 and in the cylinders 14 in order to unlock the appliance in accordance with the invention. This appliance is then made to advance into the pipe 2 which has just been laid, as far as close to the female end 37 of the latter. The appliance is locked at this point and one proceeds with laying the pipe in accordance with the manner which has just been described.

It is well to observe that the person operating the appliance is in immediate proximity to the jointing zone of the two pipes and hence can on their own perfectly supervise the jointing operation. This person can preferably enter the pipe to be laid as soon as it has for example, been lowered into the trench and is close above the bottom of the latter. Afterwards they remain always inside the pipe to be laid, hence secure from any risk of caving in of the trench. Furthermore possible dropping of the pipe to be laid would no longer from this time have any unfortunate consequence since the height of fall would be small and the person inside the pipe would be able to put up with it without any damage. For this reason it even becomes possible to lay such pipes by means of hydraulic machines. That has been forbidden hitherto because of the compulsory presence of workmen in the trench underneath the pipe to be laid in order to guide it during the course of jointing, which always implies the employment of a first machine, for example, a hydraulic one for digging the trench and a second mechanical machine for lowering the pipe into the trench.

It is as well to observe that the appliance in accordance with the invention is designed so as to leave the centre of the pipes free in order to allow a laser beam to pass through, which is employed as a means of guidance for the laying of pipes composed of jointed sections of pipe.

It goes without saying that it is possible to replace the majority of the parts of the appliance as described above and represented on the attached drawing, by equivalent parts without thereby departing from the scope of the invention.

I claim:

1. An apparatus for assembling jointed large-diameter pipes, comprising, a carriage which is movable inside a stationary said pipe laid in position, locking means on said carriage for locking said carriage within and near the free end of the stationary pipe, said locking means being engageable with the interior of the stationary pipe to prevent axial movement of the carriage, levelling and centering means supported by the locking means and located to project axially from an upper part of the free end of the stationary pipe to level and center the next pipe to be laid, and hauling means for pulling another pipe toward the apparatus and into engagement with the stationary pipe, means connecting said hauling means to said locking means to bias said locking means against the interior of the stationary pipe in response to operation of said hauling means.

2. The apparatus of claim 1, wherein the locking means includes at least one strut whose overall length is greater than the interior diameter of said pipes, said strut being hinged between its two ends onto said carriage for pivotal movement in a vertical longitudinal plane of the carriage, a shoe hinged onto the bottom end of said strut, said levelling and centering means including an arch hinged onto the upper end of said strut for pivotal movement in a vertical longitudinal plane of the carriage, said levelling and centering means including a portion of said arch projecting beyond the free end of the stationary pipe over a portion of its length when the carriage is locked in said pipe near the free end of said pipe, and manipulating means for making the strut pivot to make said shoe and said arch bear against the pipe interior at two substantially diametrically opposite points.

3. The apparatus of claim 2, wherein said strut is adjustable in length in order to accommodate pipes of different diameters.

4. The apparatus of claim 2, including two said struts mounted side by side, said arch comprising three segments hinged together about longitudinal axes, each of said struts being connected to one of the outer segments of the arch.

5. The apparatus of claim 2, wherein said manipulating means extends and is operable between the carriage and the bottom end of said strut, and tension spring means biasing said strut against the force of said manipulating means.

6. The apparatus of claim 2, wherein said manipulating means comprises a first hydraulic jack and said hauling means comprises a second hydraulic jack, a common hydraulic pump mounted on the carriage and connected by a directional control valve to said two jacks.

7. The apparatus of claim 1, wherein the wheels of the carriage are inclined outwardly and their track is adjustable in order to accommodate the carriage to pipes of different diameters.

8. An apparatus for assembling and joining large-diameter pipes such as concrete pipes being laid in a trench, comprising:
a carriage with four wheels, having its longitudinal axis parallel to the axis of said pipes and being movable inside the laid pipes to a position near the free end of the last pipe laid;
at least one strut hinged between its ends to said carriage about a horizontal axis perpendicular to said longitudinal axis of the carriage, said strut carrying at its lower end below said hinge axis a ball-joint shoe and at its top end above said hinge axis an arch, said arch being hinged onto said strut about an horizontal axis perpendicular to said longitudinal axis of the carriage, the overall length of said strut including said shoe and said arch being greater than the diameter of the pipes to be laid, said strut being inclined in a vertical longitudinal plane, so that its top end carrying said arch is closer to the free end of the last laid pipe than its bottom end carrying said shoe;
a manipulating means having its ends connected respectively to said carriage and said strut, the connection of said manipulating means to the strut being situated below the hinge axis of the strut onto the carriage, said manipulating means being operable to pivot said strut in said vertical plane to reduce the inclination of the strut with respect to the vertical and make said shoe and said arch bear against the inside of the pipe at two substantially diametrically opposite points, thus locking the apparatus in the pipe so that said arch extends beyond the free end of the last laid pipe over a portion of its length, the hinge between said arch and said strut being inside and near the free end of said pipe; and
a hauling means having one end hinged onto said strut, below the hinge axis of said strut and the carriage, a cable secured to the other end of the hauling means for connection to the next pipe to be laid, said hauling means being operable to draw the next pipe to be laid toward the laid pipe, the outwardly projecting portion of the arch levelling and centering the next pipe, said drawing augmenting the locking effect of said manipulating means of said strut in the laid pipe.

9. The apparatus of claim 8, further comprising a spring operable between said carriage and said strut, said spring being opposed to the action of said manipulating means in order to incline said strut with respect to the vertical and unlock said strut when said manipulating means is not actuated.

10. The apparatus of claim 8, further comprising a spring operable between said arch and said strut to pivot the arch about its hinge axis when said strut is not locked and to assume a greater inclination than when it is locked, thus bringing the said arch to a position substantially parallel to the wall of the pipe.

11. The apparatus of claim 8 wherein said manipulating means and said hauling means are hydraulic jacks, a common hydraulic pump mounted on the carriage and connected to the jacks by a directional control valve.

12. The apparatus of claim 8, wherein the said strut is adjustable in length in order to accommodate pipes of different diameters.

13. The apparatus of claim 8, wherein the wheels of said carriage are inclined outwardly and their track is adjustable in order to accommodate the carriage to pipes of different diameters.

14. The apparatus of claim 8, having two said struts which are parallel and rigidly connected to each other, the hinge axes of said struts being aligned, and wherein said arch comprises three curved segments hinged together about two axes contained in vertical planes which are parallel to said longitudinal axis of the carriage, two said ball-joint shoes each being hinged onto the bottom end of one of said two struts, the outer said segments of said arch being respectively hinged to the upper ends of said struts.

* * * * *